United States Patent [19]

Longfield et al.

[11] 3,832,448

[45] Aug. 27, 1974

[54] PROCESS FOR PRODUCTION OF PHOSPHORUS

[76] Inventors: James Edgar Longfield, Stamford; Daniel Hyman, Greenwich, both of Conn.

[22] Filed: Oct. 29, 1969

[21] Appl. No.: 872,004

[52] U.S. Cl. ............................................. 423/322
[51] Int. Cl. ...................... C01b 25/02, C01b 25/04
[58] Field of Search ....................................... 23/223

[56] References Cited
UNITED STATES PATENTS

| | | | |
|---|---|---|---|
| 3,010,796 | 11/1961 | Alexander et al. .................... | 23/223 |
| 3,247,014 | 5/1963 | Goldberger et al. ............... | 23/223 X |
| 3,380,904 | 4/1968 | Goldberger .......................... | 204/164 |
| 3,481,706 | 12/1969 | Veltman et al. ....................... | 23/223 |

*Primary Examiner*—Oscar R. Vertiz
*Assistant Examiner*—Gregory A. Heller
*Attorney, Agent, or Firm*—Gordon L. Hart

[57] ABSTRACT

Phosphorus is produced by reduction of phosphate ores with hydrocarbon gas in a stream comprising finely divided phosphate solids dispersed as a dilute solid phase in a gas stream which contains the hydrocarbon reactant. Extremely high reaction temperature is attained by heating the reactants with a gas plasma.

16 Claims, 1 Drawing Figure

PATENTED AUG 27 1974 3,832,448
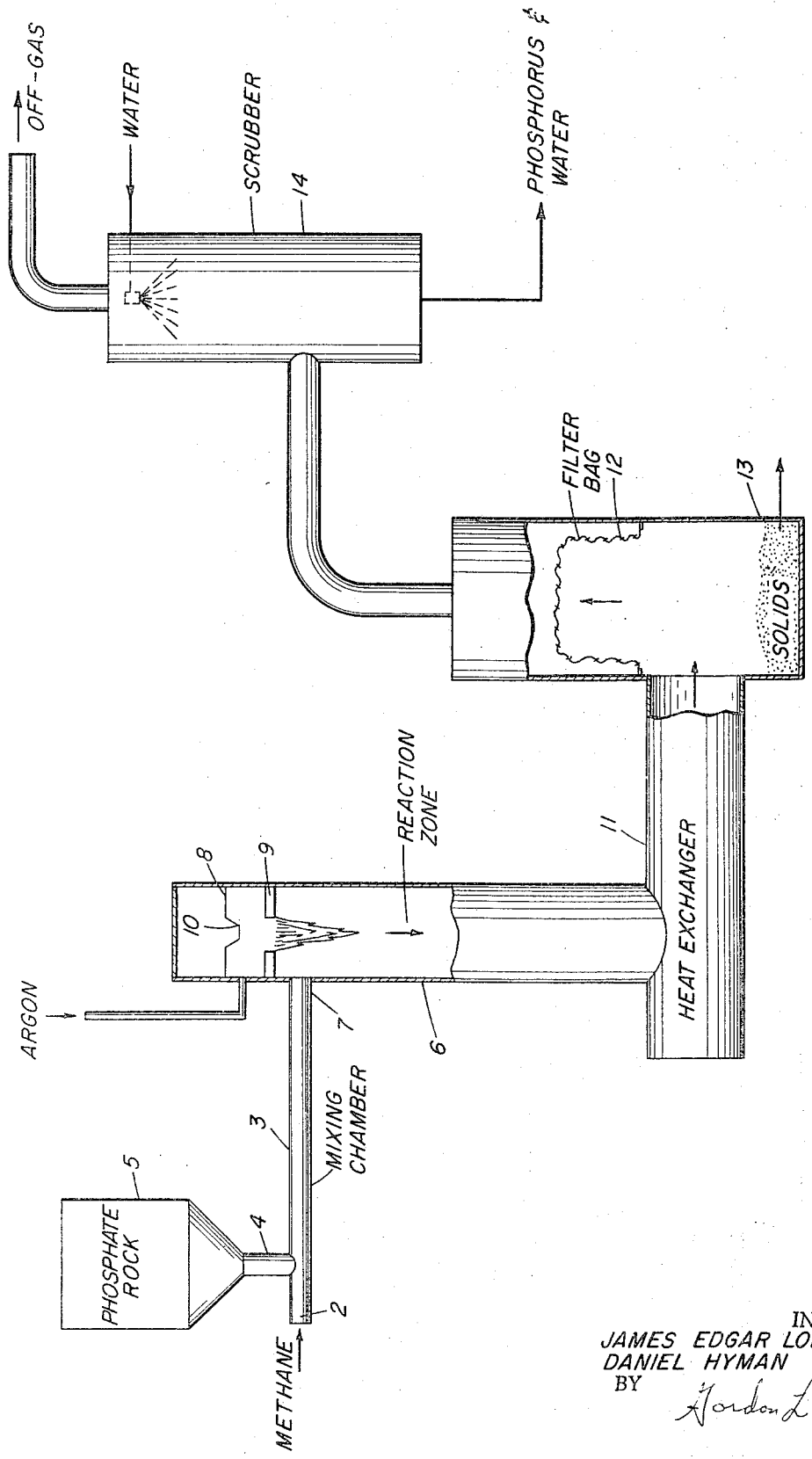
INVENTORS.
JAMES EDGAR LONGFIELD
DANIEL HYMAN
BY
Gordon L. Hart
ATTORNEY

PROCESS FOR PRODUCTION OF PHOSPHORUS

The invention relates to a production of elemental phosphorus by reduction of inorganic phosphates, and particularly mineral phosphate rock containing calcium phosphate, at high temperature with hydrocarbon gas.

In the art, prior to this invention, calcium phosphate, present in phosphate rock has been reduced, for example, by carbon in an electric furnace in presence of silica as a fluxing agent.

The invention provides a process for production of phosphorus by reduction of calcium phosphate with a hydrocarbon gas such as methane, using heat generated by a plasma generator. In a process according to the invention it is not necessary to add a fluxing agent such as silica, and it is not necessary to nodulize the pulverized phosphate solids as is necessary in the electric furnace process. The invention is easily adaptable for continuous process design because the reaction is most advantageously carried out in a stream of mixed reactants which flows continuously through a heated reaction zone.

In a process embodying the invention, finely divided particulate solids such as phosphate rock comprising calcium phosphate are suspended and transported as a dilute solids phase in a high velocity fluid stream containing hydrocarbon gas which will react at high temperature as a reducing agent. This stream of gas and suspended solids flows through a high temperature reaction zone where the solid and gas reactants in the stream are heated to reaction temperature by means of heat from a stream of plasma gas which is directed into the reaction zone. The flow rates of reactants and plasma gas are adjusted to maintain in the reaction zone a desired reaction temperature in the range from about 1,200 to about 2,200 degrees Kelvin (°K).

In one embodiment of the invention, a plasma jet is produced by a direct current arc generator, using Argon as the plasma gas. The plasma jet is directed downward into an upright cylindrical reaction zone. Natural gas, which contains methane to be used as the reducing reactant, is fed continuously in a high velocity gas stream through a mixing chamber in which finely divided phosphate rock particles are metered into the gas stream. The fine solid particles are suspended as a dilute solid phase in the high velocity gas stream, and transported in the stream directly into the reaction zone at a point near the plasma jet inlet. The gas-solids stream is directed into the very high temperature plasma jet which rapidly heats the stream comprising hydrocarbon and phosphate reactants to reaction temperature. The proportion of hydrocarbon gas to solids in said stream preferably is in a range to provide 1.2 to 5.0 gram atoms carbon in the gas to one gram atom phosphorus in the solids. The solids, still dispersed in the gas mixture which now consists of the mixed natural gas and plasma gas, are transported at high velocity through the reaction zone. This zone is of size sufficient, at the operating feed rates, to provide adequate residence time, in most embodiments at least 20 milliseconds for high temperature reduction of the particulate phosphate solids by methane in the reaction zone. At the temperatures in the reaction zone the phosphorus is in the vapor phase and is transported in the gas phase through the reactor. The reactor product stream consisting of solids entrained in a gas stream is directed through a cooling chamber where some heat is withdrawn, but temperature is maintained above the condensation temperature of phosphorus. The cooled stream, with solids still in dilute disperse phase is directed to a gas-solids separator such as a filter bag or a cyclone separator. It is preferred to keep the temperature of the stream above the condensation temperature of phosphorus until after the solids are separated. After separation of solids, the gas stream is directed to a water spray chamber where the gases are further cooled and phosphorus condenses. Phosphorus is then recovered from the spray chamber.

The drawing illustrates a laboratory apparatus suitable for carrying out a process in accordance with invention. The drawing is a diagrammatic sketch of the apparatus. Referring now to the drawing, reference numeral 2 designates a gas inlet port through which a high velocity gas stream is fed into a mixing chamber 3 which is a 12 in. long, ⅛ in. inside diameter alumina tube. Fine particulate solids are metered into the mixing chamber 3 through a solids inlet port 4 from a solids feed container 5. The particulate solids are dispersed in the gas stream as it proceeds through the mixing chamber 3 and the stream of mixed solids and gas enters a reactor 6 through an alumina feed tube 7 leading from the mixing chamber 3 through the reactor wall to a point inside the reactor at which the gas-solids stream is fed directly into a plasma jet. The reactor 6 in this embodiment is a 20 in. long, upright, 3 in. i.d. cylinder of alumina. At the top of the reactor 6 is a direct current plasma torch 8 located so that it will direct its generated plasma jet downward, concentrically, inside the reactor 6. The plasma arc generator comprises a metal electrode ring 9 and a vertical electrode rod 10 with its tip located concentrically just above the ring 9 in the torch 8. When the electrodes 9 and 10 are charged electrically, an arc is generated between the tip of the rod 10 and the ring 9. Argon fed into the torch 8 at an inlet above the arc is forced through the ring 9 where it is ionized and heated by the arc, and flows therefrom downward as a plasma jet inside the reactor 6. The lower end of the reactor 6 opens into a heat exchanger 11 in which the gas-solids reactor effluents are partially cooled. The heat exchanger is a steam jacketed tube 60 in. long, 6 in. i.d. The entire apparatus is sealed to exclude air from the gas stream throughout.

The reactor 6 is thermally insulated from the plasma generator at the top of the reactor and from the heat exchanger 10 at the bottom. Both the heat exchanger and the plasma generator have cooling jackets not shown in the drawing.

The outlet of the heat exchanger leads to a filter bag 12 of heat-resistant fabric where solids are separated and collected as they fall into the solids collection box 13. The gases proceed through the filter bag 12 and are fed to a scrubber column 14 where the gases are cooled and phosphorus is condensed in a countercurrent stream of water.

The apparatus of the drawing is employed in the following example which describes a preferred mode of carrying out the invention.

EXAMPLE 1

Natural gas is fed in a high velocity stream through mixing chamber 3 at a rate of 0.248 gm. moles/min. methane. powdered phosphate rock (BPL grade 68/66, 85 percent — 200 mesh) is fed into the mixing chamber 3 at a rate of 20 gm/min. The powdered rock is dispersed in the stream of natural gas and led directly into the reactor 6. A plasma jet is produced by feeding 1.45 gm. moles/min. Argon through the plasma generator. The power input to the Argon is 3.05 Kw. The plasma has an energy content of 1,370 BTU/lb Argon. The stream of phosphate rock and methane is directed into the plasma jet within the reactor. At the flow rates used, there is a calculated 13 percent excess of methane above stoichiometric for reduction of all the phosphorus by the carbon in the methane. Estimated reaction temperature is 1,660°K, based on a calculated heat balance. Residence time in the reactor 6 is calculated to be 0.57 seconds.

The reactor effluent is cooled in the steam-jacketed heat exchanger 11 to 500°K. Solids are separated and the gas to the scrubber, less phosphorus which condenses before analysis, is analyzed as containing:

9.1% Carbon monoxide
15.6% Hydrogen
75.3% Argon

Hydrocarbons may have been present in proportion less than 1 percent. Phosphorus is recovered from water in the scrubber at a calculated yield of 88 percent based on phosphorus content of the phosphate rock feed to the reactor. The scrubbed gases are diluted with nitrogen and exhausted to stack.

Argon is the plasma gas in the example above, but other gases that remain inert in the reactor, such as hydrogen may be used instead. In a variation of the invention a hydrocarbon gas may be included in the plasma gas to provide part of the reducing reactant feed to the reactor.

The plasma arc generator used in the example is a direct current generator, but any suitable plasma generator may be substituted, such as an alternating current plasma arc generator, a radio frequency plasma generator or the like.

We claim:

1. A process for production of elemental phosphorus by reduction of phosphate-containing ore with hydrocarbon gas, said process comprising
   a. suspending fine particulate solids comprising phosphate-containing ore as a dilute solid phase in a stream of gas which comprises a hydrocarbon gas reactant, and transporting through a reaction zone the gas and suspended solids in said stream heated in said reaction zone, by means of a separate hot gas stream issuing from a plasma generator, to reaction temperature in the range from 1,200° to 2,200°K, thereby reducing phosphate in said suspended solids by said hydrocarbon to elemental phosphorus in said reaction zone at said reaction temperature, and
   b. condensing elemental phosphorus from the gas phase of the stream flowing from said reaction zone.

2. A process defined by claim 1 wherein residence time of reactant solids in said reaction zone at said reaction temperature is at least 20 milliseconds.

3. A process defined by claim 1 wherein the defined hydrocarbon reactant in said gas stream consists essentially of methane.

4. A process defined by claim 1 wherein said suspended solids comprise finely pulverized mineral phosphate rock.

5. A process defined by claim 1 wherein the plasma gas is a gas which is chemically inert in said reaction zone.

6. A process defined by claim 1 wherein the proportion of hydrocarbon gas to solids in said stream is in a range to provide from 1.2 to 5.0 gram atoms carbon in the gas to one gram atom phosphorus in the solids.

7. A process defined by claim 1 wherein said particulate solids and hydrocarbon gas are fed together to said reaction zone in a high velocity stream with said solids suspended in the gas in dilute phase, and said stream is heated by plasma gas in said reaction zone.

8. A process defined by claim 1 wherein the plasma gas comprises a hydrocarbon reactant.

9. A process defined by claim 1 wherein said plasma is produced by an A.C. or D.C. plasma arc or a radio frequency plasma generator.

10. A process for production of elemental phosphorus by the reduction of phosphate-containing ore with hydrocarbon gas at an elevated reaction temperature wherein the entire heat of reaction for said reduction is supplied to the phosphate and hydrocarbon reactants by plasma gas heated in a plasma generator.

11. A process defined by claim 10 wherein the reaction temperature is in the range 1,200–2,200°K.

12. A proces defined by claim 10 wherein the phosphate and hydrocarbon reactants are present together at said reaction temperature for at least 20 milliseconds.

13. A process defined by claim 10 wherein the defined hydrocarbon reactant consists essentially of methane.

14. A process defined by claim 10 wherein the plasma gas is a gas which is chemically inert to the defined reaction.

15. A process defined by claim 10 wherein the plasma gas is a hydrocarbon reactant.

16. A process defined by claim 10 wherein said plasma generator is an A.C. or D.C. plasma arc or a radio frequency plasma generator.

* * * * *

UNITED STATES PATENT OFFICE
CERTIFICATE OF CORRECTION

Patent No. 3,832,448             Dated August 27, 1974

Inventor(s) JAMES EDGAR LONGFIELD AND DANIEL HYMAN

It is certified that error appears in the above-identified patent and that said Letters Patent are hereby corrected as shown below:

In the Heading, following item No. [75], insert

-- [73] Assignee: American Cyanamid Company,

Stamford, Conn.  --

Signed and sealed this 3rd day of December 1974.

(SEAL)
Attest:

McCOY M. GIBSON JR.　　　　　　　　C. MARSHALL DANN
Attesting Officer　　　　　　　　　Commissioner of Patents